United States Patent
Han et al.

(10) Patent No.: US 10,565,764 B2
(45) Date of Patent: Feb. 18, 2020

(54) COLLABORATIVE AUGMENTED REALITY SYSTEM

(71) Applicant: AT&T Intellectual Property I, L.P., Atlanta, GA (US)

(72) Inventors: Bo Han, Bridgewater, NJ (US); Vijay Gopalakrishnan, Edison, NJ (US); Eric Zavesky, Austin, TX (US); Wenxiao Zhang, Kowloon (HK); Pan Hui, Kowloon (HK)

(73) Assignees: AT&T INTELLECTUAL PROPERTY I, L.P., Atlanta, GA (US); The Hong Kong University of Science and Technology, Hong Kong (CN)

( * ) Notice: Subject to any disclaimer, the term of this patent is extended or adjusted under 35 U.S.C. 154(b) by 5 days.

(21) Appl. No.: 15/948,697

(22) Filed: Apr. 9, 2018

(65) Prior Publication Data

US 2019/0311513 A1 Oct. 10, 2019

(51) Int. Cl.
| | |
|---|---|
| G06T 13/20 | (2011.01) |
| G06T 11/60 | (2006.01) |
| H04L 29/08 | (2006.01) |
| H04L 29/06 | (2006.01) |
| G06F 3/14 | (2006.01) |

(52) U.S. Cl.
CPC ............ G06T 11/60 (2013.01); G06F 3/1454 (2013.01); H04L 67/306 (2013.01); H04L 67/38 (2013.01)

(58) Field of Classification Search
None
See application file for complete search history.

(56) References Cited

U.S. PATENT DOCUMENTS

| | | |
|---|---|---|
| 8,264,505 B2 | 9/2012 | Bathiche et al. |
| 9,105,210 B2 | 8/2015 | Lamb et al. |
| 9,417,691 B2 | 8/2016 | Belimpasaki et al. |
| 9,471,619 B2 | 10/2016 | Olsen |

(Continued)

FOREIGN PATENT DOCUMENTS

| | | |
|---|---|---|
| WO | 9916206 | 4/1999 |
| WO | 2015095507 | 6/2015 |
| WO | 2017077432 | 5/2017 |

OTHER PUBLICATIONS

Tobias H. Höllerer and Steven K. Feiner, "Mobile Augmented Reality," Chapter Nine, Telegeoinformatics: Location-Based Computing and Services. H Karimi and A. Hammad (eds.). Taylor & Francis Books Ltd. Jan. 2004.

(Continued)

*Primary Examiner* — Martin Mushambo
(74) *Attorney, Agent, or Firm* — Haynes and Boone, LLP (57) ABSTRACT

An augmented reality device computationally processes an image frame against a first augmented reality profile stored in a local database. The first augmented reality profile includes first annotation content associated with a first object and is obtained from a second user device. In response to an object computationally processed from the first image frame satisfying a predetermined threshold of similarity with the first object in the first augmented reality profile, the first annotation content is rendered, on a display of the first user device, relative to the first object according to rendering instructions for the first annotation content.

20 Claims, 6 Drawing Sheets

(56) References Cited

U.S. PATENT DOCUMENTS

| | | | |
|---|---|---|---|
| 9,606,363 B2 | 3/2017 | Zalewski | |
| 9,710,969 B2 | 7/2017 | Malamud et al. | |
| 9,721,386 B1 | 8/2017 | Worley et al. | |
| 9,740,372 B2 | 8/2017 | George et al. | |
| 9,756,253 B2 | 9/2017 | Inoue | |
| 2010/0257252 A1 | 10/2010 | Dougherty et al. | |
| 2012/0249586 A1* | 10/2012 | Wither | H04N 1/00323 345/633 |
| 2014/0285519 A1 | 9/2014 | Uusitalo et al. | |
| 2014/0368538 A1* | 12/2014 | Ratcliff | G06Q 50/10 345/633 |
| 2015/0022535 A1 | 1/2015 | Zhao et al. | |
| 2015/0070347 A1* | 3/2015 | Hofmann | G06K 9/00208 345/419 |
| 2015/0175068 A1 | 6/2015 | Szostak et al. | |
| 2015/0248783 A1 | 9/2015 | Fayle | |
| 2015/0279117 A1* | 10/2015 | Schimke | G06F 16/00 345/633 |
| 2015/0339453 A1 | 11/2015 | Richards et al. | |
| 2015/0348329 A1 | 12/2015 | Carre et al. | |
| 2016/0055371 A1* | 2/2016 | Wu | H04L 67/306 382/118 |
| 2016/0247324 A1 | 8/2016 | Mullins et al. | |
| 2016/0267674 A1* | 9/2016 | Barak | G06K 9/00288 |
| 2017/0004019 A1 | 1/2017 | Hui et al. | |
| 2017/0169617 A1 | 6/2017 | Rodriguez | |
| 2017/0206508 A1 | 7/2017 | Apajalahti et al. | |
| 2017/0221265 A1 | 8/2017 | Lin | |
| 2017/0243403 A1 | 8/2017 | Daniels et al. | |
| 2017/0359442 A1 | 12/2017 | Jordan | |
| 2018/0322703 A1* | 11/2018 | Averianov | G06K 9/46 |
| 2018/0351962 A1* | 12/2018 | Kulkarni | H04L 63/105 |

OTHER PUBLICATIONS

Mark Billinghurst and Hirokazu Kato, "In Proceedings of the First International Symposium on Mixed Reality (ISMR '99). Mixed Reality—Merging Real and Virtual Worlds, Berlin: Springer Verlag" Human Interface Technology Laboratory, University of Washington Apr. 2017.

Gerhard Reitmayr and Dieter Schmalstieg, "Collaborative Augmented Reality for Outdoor Navigation and Information Browsing," Interactive Media Systems group, Vienna University of Technology 2004.

* cited by examiner

COLLABORATIVE AUGMENTED REALITY SYSTEM

FIELD OF THE DISCLOSURE

This disclosure relates generally to augmented reality, and, more particularly, to collaborative augmented reality between user devices.

BACKGROUND

Augmented reality enhances the physical world by creating virtual annotations to augment one's perception of reality. It has found applications in various areas, such as training, communication, entertainment, education, driving-safety, and healthcare. As a result in recent advances of augmented reality devices (e.g., Microsoft® HoloLens) and development of augmented reality applications for use with personal devices such as mobile phones and tablet computing devices, as well as development of communication technologies (e.g., 5G and 802.11ac/ad), AR applications will likely become ubiquitous and be widely adopted by consumers and businesses. However, most augmented reality applications operate independently in a standalone way and may be computationally intensive to maintain. Furthermore, the variable nature of augmented reality environments results in challenges for developers when creating augmented reality applications.

SUMMARY

Systems and methods have been provided for collaborative augmented reality. A user device may collaborate with other user devices within a physical environment that are using the same augmented reality application to receive and/or provide information between each other such that computationally expensive augmented reality results are can be shared between user devices rather than requested from a cloud-based application repetitively by each user device when that user device performs object recognition on the same object. This improves efficiency by reusing computation resources in the cloud, reduces end-to-end latency, and saves mobile data usage.

In various embodiments of the methods and systems disclosed herein, a first user device computationally processes a first image frame against a first augmented reality profile stored in a local database. The first augmented reality profile includes first annotation content associated with a first object and is obtained from a second user device. In response to an object computationally processed from the first image frame satisfying a predetermined threshold of similarity with the first object in the first augmented reality profile, the first user device correlates the object as the first object, and renders, on a display of the first user device, the first annotation content relative to the first object according to rendering instructions for the first annotation content.

In various embodiments of the methods and systems disclosed herein, the first user device, in response to the object computationally processed from the first image frame not satisfying the predetermined threshold of similarity with the first object in the first augmented reality profile or any other objects in other augmented reality profiles stored in the local database, provides the first image frame to a server device to be computationally processed against a plurality of augmented reality profiles in a network database. The first user device receives a second augmented reality profile of the plurality of augmented reality profiles where the object computationally processed from the first image frame satisfies a predetermine threshold of similarity with a second object identified in the second augmented reality profile. Second annotation content included in the second augmented reality profile is rendered on the display of the first user device relative to the second object according to rendering instructions for the second annotation content.

In various embodiments of the methods and systems disclosed herein, the first user device provides the second augmented reality profile to the local database such that the second augmented reality profile is accessible by the second user device to computationally process a third image frame against the second augmented reality profile.

In various embodiments of the methods and systems disclosed herein, the user device provides the first image frame to the server device to be computationally processed against the plurality of augmented reality profiles in a network database includes providing a compact feature representation of the first image frame that was computationally processed by the first user device when computationally processing the first image frame against the first augmented reality profile stored in the local database.

In various embodiments of the methods and systems disclosed herein, the first augmented reality profile was obtained, by the second user device in wireless communication with the first user device, when the second user device provided a second image frame to a server device over a network due to the second image frame not satisfying a predetermined threshold of similarity with any augmented reality profiles stored in the local database, and the server device computationally processed the second image frame against a plurality of augmented reality profiles stored in a network database, and provided the first augmented reality profile of the plurality of augmented reality profiles to the second user device in response to an object computationally processed from the second image frame satisfying a predetermine threshold of similarity with the first object included in the first augmented reality profile.

In various embodiments of the methods and systems disclosed herein, the first user device monitors the first augmented reality profile for second annotation content provided by the second user device. In response to detecting second annotation content, the first user device renders, on the display of the first user device, second annotation content included in the first augmented reality profile relative to the first object according to rendering instructions for the second annotation content.

In various embodiments of the methods and systems disclosed herein, the first user device modifies the first annotation content to second annotation content based on received user input instruction, stores the second annotation content in the first augmented reality profile, and provides the second annotation content to any user device consuming the first annotation content.

In various embodiments of the methods and systems disclosed herein, the first user device detects an augmented reality event, and captures the first image frame, using an image capture device, in response to detecting the augmented reality event.

In various embodiments of the methods and systems disclosed herein, the first user device provides location data of the first user device to a server device over time. The first user device receives a second augmented reality profile from the server device based on a known location of the object associated with the second augmented reality profile, a current location of the first user device, and a direction that the first user device is travelling within a physical environment, and stores the second augmented reality profile in the local database.

In various embodiments of the methods and systems disclosed herein, the second augmented reality profile is stored in network cache that have been computationally processed by the server device for the second user device.

Embodiments of the present disclosure may be understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include collaborative augmented reality systems and methods that may be used, for example, to share between user devices results of processes performed by a server device. As discussed above, existing augmented reality systems mainly focus on solitary environments and neglect the potential opportunities brought by the collaboration and interaction of their users. The present disclosure proposes Collaborative Augmented Reality for Socialization (CARS), a framework that enables the social nature of human beings for improving user-perceived Quality of Experience (QoE). As augmented reality ties closely to the physical world, its users seeing overlapped scenes are likely to be in the vicinity of each other, which allows collaboration and interaction among them. CARS takes advantage of this unique feature of augmented reality to support intelligent sharing of information between nearby users via local (e.g., peer-to-peer, device-to-device) communications. It brings various benefits at user, application and system levels, e.g., reuse of networking resources and computation in the cloud.

The systems and methods of the present disclosure provide for a collaborative augmented reality system that computationally processes a first image frame against a plurality of augmented reality profiles that each includes annotation content associated with an object and that are stored in a local augmented reality database. An augmented reality profile of the plurailt of augmented reality profiles in the local augmented reality database is provided by a second user device in wireless communication with the first user device. The second user device obtained the augmented reality profile by providing a second image frame to a server device over a network, such that the server device computationally processed the second image frame against a plurality of augmented reality profiles stored in a network augmented reality database to identify the augmented reality profile, and provided at least a portion of the augmented reality profile to the second user device in response to an object recognized from the second image frame satisfying a predetermine threshold of similarity with the object included in the augmented reality profile. In response to an object computationally processed from the first image frame satisfying a predetermined threshold of similarity with the first object in the augmented reality profile of the plurality of augmented reality profile, the annotation content included in the augmented reality profile may be rendered on a display of the first user device. The annotation content can be rendered relative to the object according to rendering instructions for the annotation content. These systems and methods reduce the amount of mobile bandwidth required to operate an augmented reality application as well as freeing up network resources by reusing resources provided by the server device at a local level.

Figure 1:
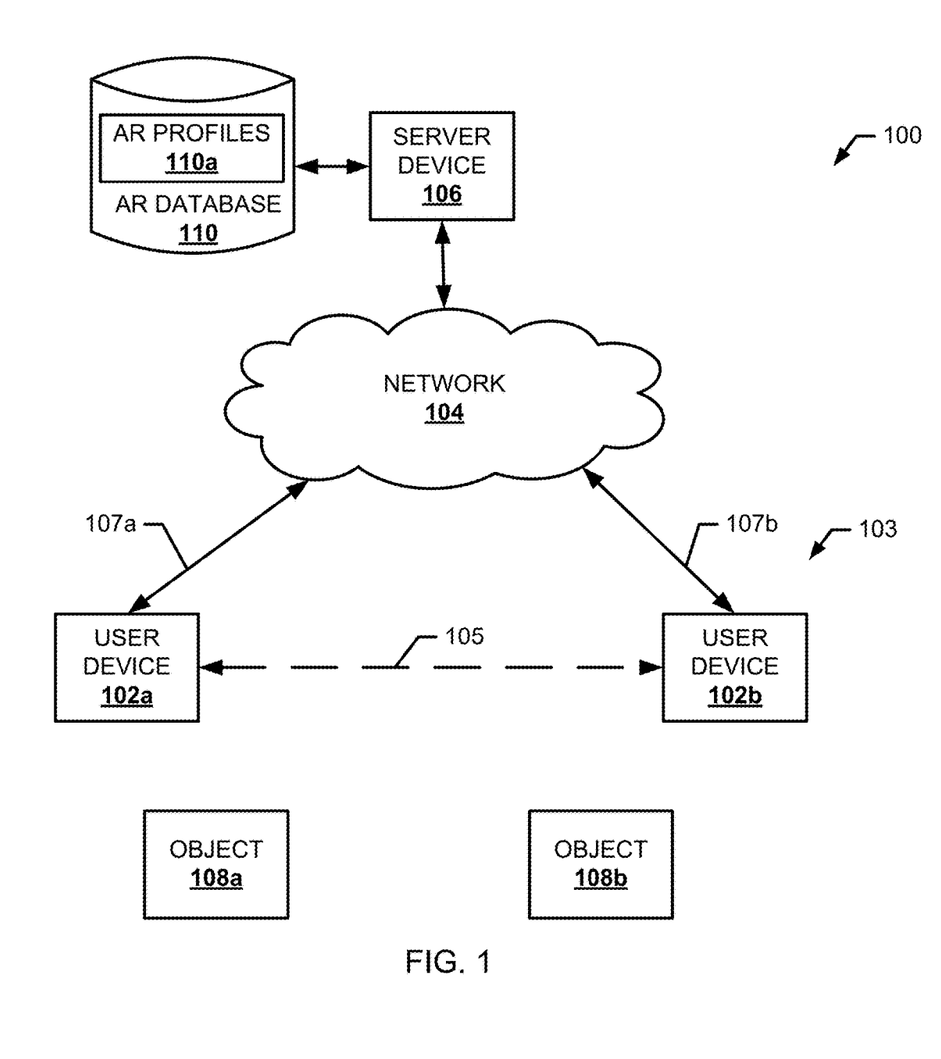
FIG. 1 is a schematic view illustrating an embodiment of a collaborative augmented reality system.

Referring now to FIG. 1, an embodiment of a collaborative augmented reality system 100 is illustrated. In the illustrated embodiment, the collaborative augmented reality system 100 includes a user device 102a and a user device 102b provided in a physical environment 103. The physical environment 103 may be any indoor and/or outdoor space that may be contiguous or non-contiguous. For example, the physical environment may include a yard, a home, a business, a park, a stadium, a museum, an amusement park, an access space, an underground shaft, or other spaces. The physical environment 103 may be defined by geofencing techniques that may include specific geographic coordinates such as latitude, longitude, and/or altitude, and/or operate within a range defined by a wireless communication signal. The physical environment 103 may include a plurality of objects such as an object 108a and an object 108b.

In various embodiments, the user devices 102a and 102b are described as mobile computing devices such as laptop/notebook computing devices, tablet computing devices, mobile phones, and wearable computing devices. However, in other embodiments, the user device 102a and 102b may be provided by desktop computing devices, server computing devices, and/or a variety of other computing devices that would be apparent to one of skill in the art in possession of the present disclosure. The user device 102a and the user device 102b may include communication units having one or more transceivers to enable the user device 102a and the user device 102b to communicate with each other and/or a server device 106. Accordingly and as disclosed in further detail below, the user device 102a may be in communication with the user device 102b directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the user device 102a and/or the user device 102b in the collaborative augmented reality system 100 of FIG. 1 include first (e.g., long-range) transceiver(s) to permit the user device 102a and/or the user device 102b to communicate with a network 104 via a communication channel 107a and a communication channel 107b, respectively. The network 104 may be implemented by an example mobile cellular network, such as a long term evolution (LTE) network or other third generation (3G), fourth generation (4G) wireless network, or fifth-generation (5G) wireless network. However, in some examples, the network 104 may be additionally or alternatively be implemented by one or more other communication networks, such as, but not limited to, a satellite communication network, a microwave radio network, and/or other communication networks.

The user device 102a and/or the user device 102b additionally may include second (e.g., short-range) transceiver(s) to permit the user device 102a and/or the user device 102b to communicate with each other via a communication channel 105. In the illustrated example of FIG. 1, such second transceivers are implemented by a type of transceiver supporting short-range (i.e., operate at distances that are shorter than the long range transceivers) wireless networking. For example, such second transceivers may be implemented by Wi-Fi transceivers (e.g., via a Wi-Fi Direct protocol), Bluetooth® transceivers, infrared (IR) transceiver, and other transceivers that are configured to allow the user device 102a and/or the user device 102b to intercommunicate via an ad-hoc or other wireless network.

The collaborative augmented reality system 100 also includes or may be in connection with a server device 106. For example, the server device 106 may include one or more server devices, storage systems, cloud computing systems, and/or other computing devices (e.g., desktop computing device(s), laptop/notebook computing device(s), tablet computing device(s), mobile phone(s), etc.). As discussed below, the server device 106 may be coupled to a network augmented reality database 110 that is configured to provide repositories such as an augmented reality repository of augmented reality profiles 110a for various objects within the physical environment 103. For example, the network augmented reality database 110 may include a plurality of augmented reality profiles 110a that each includes an object identifier, annotation content and/or rendering instructions as well as any other information for providing annotation content to a display of the physical environment. Also, as discussed below, the server device 106 may be configured to provide an augmented reality controller that computationally processes image frames received from user devices to identify and match objects within the image frames with object identifiers in the augmented reality database 110 such that the associated rendering instructions and annotation content can be retrieved and provided to the user device 102a and/or the user device 102b. While not illustrated in FIG. 1, each user device 102a and 102b may be coupled to one or more local augmented reality databases, described below, that may include at least a portion of the augmented reality profiles 110a stored in the network augmented reality database 110.

Figure 2:
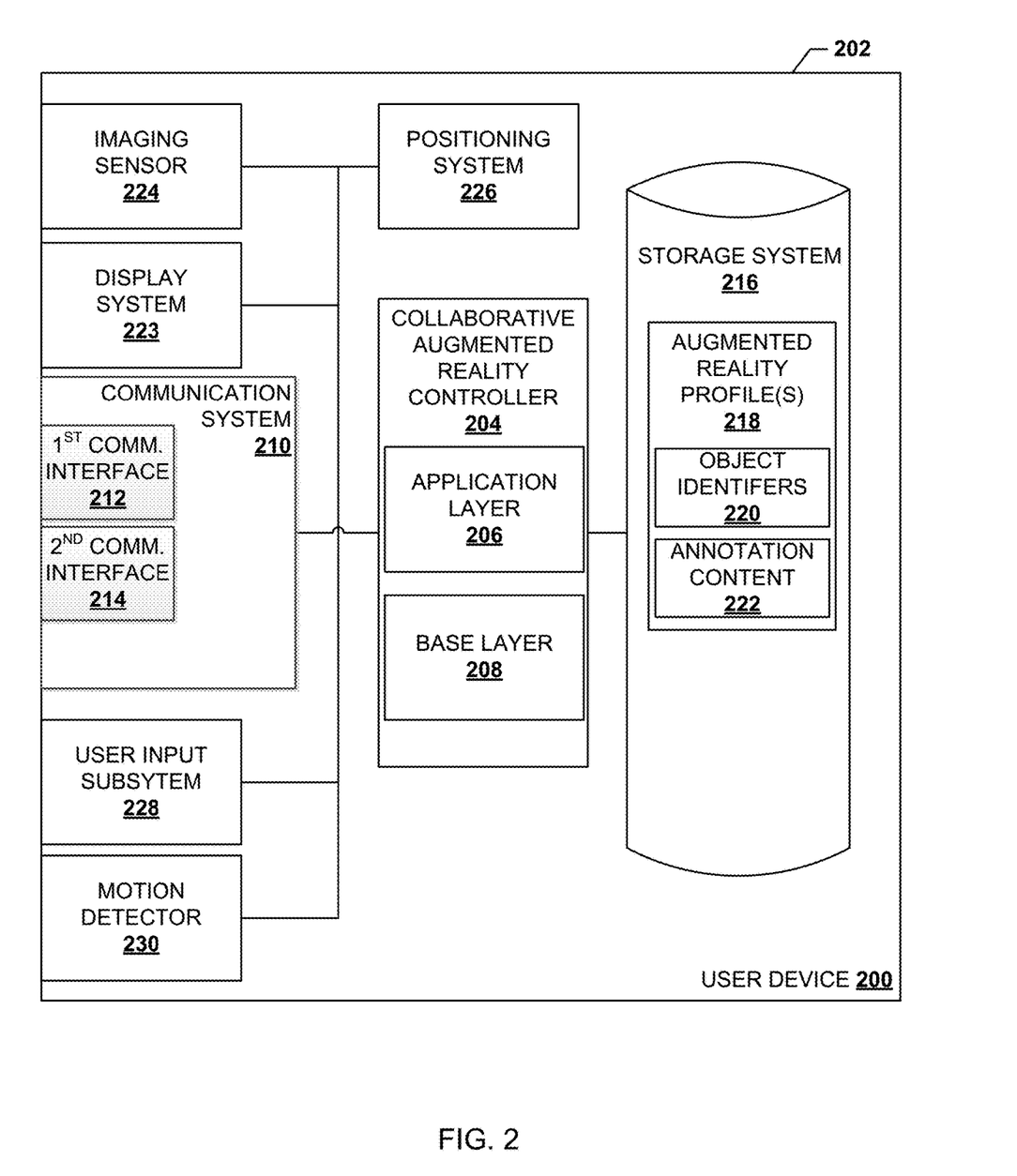
FIG. 2 is a schematic view illustrating an embodiment of a user device used in the collaborative augmented reality system of FIG. 1.

Referring now to FIG. 2, an embodiment of a user device 200 is illustrated that may be the user device 102a or the user device 102b discussed above with reference to FIG. 1, and which may be provided by a mobile computing device such as a laptop/notebook computing device, a tablet computing device, a mobile phone, and a wearable computing device. In the illustrated embodiment, the user device 200 includes a chassis 202 that houses the components of the user device 200. Several of these components are illustrated in FIG. 2. For example, the chassis 202 may house a processing system (not illustrated) and a non-transitory memory system (not illustrated) that includes instructions that, when executed by the processing system, cause the processing system to provide an collaborative augmented reality controller 204 that is configured to perform the functions of the collaborative augmented reality controller and/or the user devices discussed below. In the specific example illustrated in FIG. 2, the collaborative augmented reality controller 204 is configured to provide an application layer 206 that provides an augmented reality application discussed below and a base layer 208 that performs object recognition and annotation content retrieval tasks for the application layer 206 as well as the functionality discussed below.

The chassis 202 may further house a communication system 210 that is coupled to the collaborative augmented reality controller 204 (e.g., via a coupling between the communication system 210 and the processing system). The communication system 210 may include software or instructions that are stored on a computer-readable medium and that allow the user device 200 to send and receive information through the communication networks discussed above. For example, the communication system 210 may include a first communication interface 212 to provide for communications through the communication network 104 as detailed above (e.g., first (e.g., long-range) transceiver(s)). In an embodiment, the first communication interface 212 may be a wireless antenna that is configured to provide communications with IEEE 802.11 protocols (Wi-Fi), cellular communications, satellite communications, other microwave radio communications and/or communications. The communication system 210 may also include a second communication interface 214 that is configured to provide direct communication with other user devices, sensors, storage devices, and other devices within the physical environment 103 discussed above with respect to FIG. 1 (e.g., second (e.g., short-range) transceiver(s)). For example, the second communication interface 214 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 202 may house a storage device (not illustrated) that provides a storage system 216 that is coupled to the collaborative augmented reality controller 204 through the processing system. The storage system 216 may be configured to store augmented reality profiles 218 in one or more augmented reality repositories. The augmented reality profiles 218 may include object identifiers 220 and annotation content 222. For example, the object identifiers may include a set of feature points of the object, a QR code, an image frame, and/or any compact representation of an object. The annotation content 222 may include a two-dimensional image, a three-dimensional images, text, an audio file, a video file, a link to a website, an interactive annotation, and/or any other visual and/or auditory annotations that may be superimposed on and/or near an object or objects that the annotation content 222 is associated with in the physical environment being reproduced on a display screen included on a display system 223 of the user device 200. The annotation content 222 may also include rendering instructions that provide instructions to the user device 200 as to how the user device 200 is to display the annotation content via the display system 223. In addition, the storage system 216 may include at least one application that provides instruction to the application layer 206 of the collaborative augmented reality controller 204 when providing annotation content on a display system 223.

The chassis 202 may also house an imaging sensor 224 (e.g., a two-dimensional image capturing camera, a three-dimensional image capturing camera, an infrared image capturing camera, a depth capturing camera, similar video recorders, and/or a variety of other image or data capturing devices). The imaging sensor 224 may be a camera and/or any other sensor device that may be used to gather visual information from the monitored space surrounding the user device 200, for use in recognizing an object in the physical environment 103, and other functionality with the user device 200.

The chassis 202 may also include a positioning system 226 that is coupled to the collaborative augmented reality controller 204. The positioning system 226 may include sensors for determining the location and position of the drone in the monitored space. For example the positioning system 226 may include a global positioning system (GPS) receiver, a real-time kinematic (RTK) GPS receiver, a differential GPS receiver, a Wi-Fi based positioning system (WPS) receiver, an accelerometer, and/or other positioning systems and components.

In various embodiments, the chassis 202 also houses an input subsystem 228 that is coupled to the collaborative augmented reality controller 204 (e.g., via a coupling between the processing system and the input subsystem 228). In an embodiment, the input subsystem 228 may be provided by a keyboard input subsystem, a mouse input subsystem, a track pad input subsystem, a touch input display subsystem, and/or any other input subsystem. The chassis 202 also houses a display system 223 that is coupled to the collaborative augmented reality controller 204 (e.g., via a coupling between the processing system and the display system 223). In an embodiment, the display system 223 may be provided by a display device that is integrated into the user device 200 and that includes a display screen (e.g., a display screen on a laptop/notebook computing device, a tablet computing device, a mobile phone, or wearable device), or by a display device that is coupled directly to the user device 200 (e.g., a display device coupled to a desktop computing device by a cabled or wireless connection). The chassis 202 may also house a motion detector 230 that is coupled to the collaborative augmented reality controller 204. The motion detector 230 may include an accelerometer, a gyroscope, and/or any other sensor for detecting and/or calculating the orientation and/or movement of the user device 200.

Figure 3:
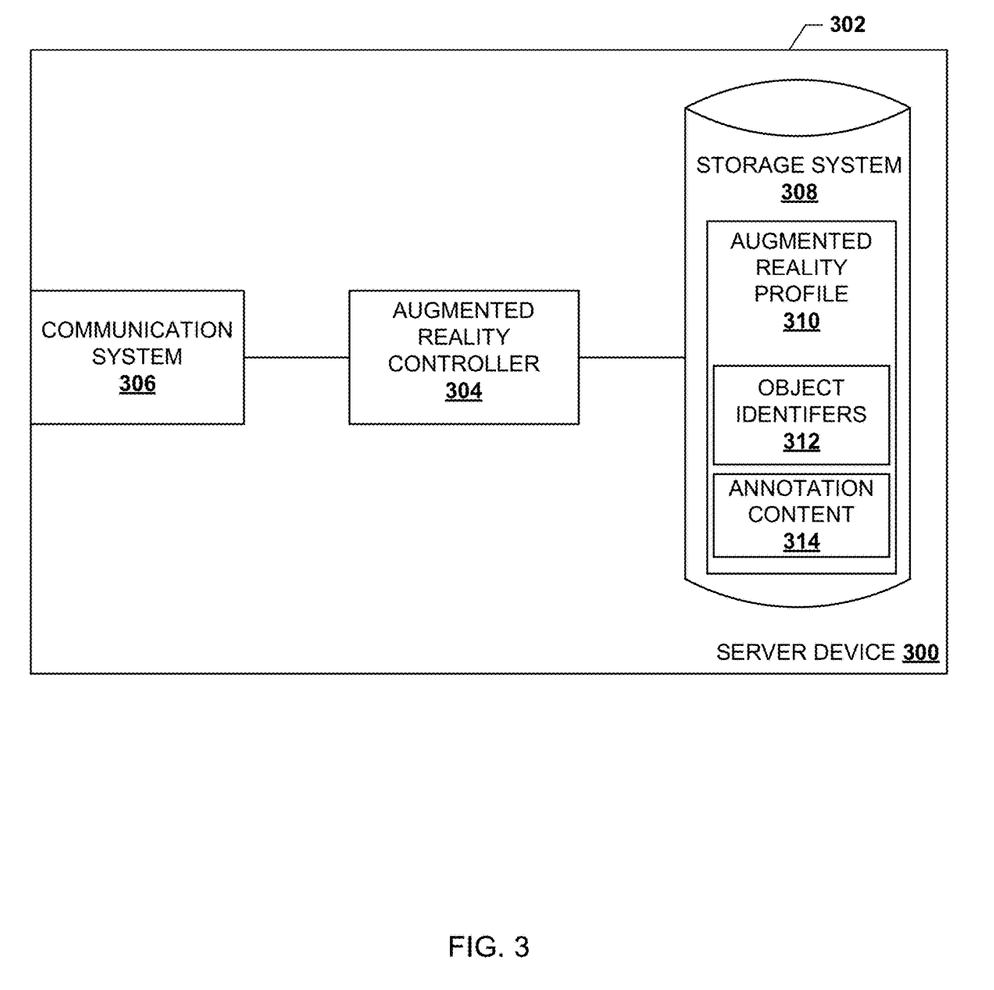
FIG. 3 is a schematic view illustrating an embodiment of a server device used in the collaborative augmented reality system of FIG. 1.

Referring now to FIG. 3, an embodiment of a server device 300 is illustrated that may be the server device 106 discussed above with reference to FIG. 1. In the illustrated embodiment, the server device 300 includes a chassis 302 that houses the components of the server device 300, only some of which are illustrated in FIG. 3. For example, the chassis 302 may house a processing system (not illustrated) and a non-transitory memory system (not illustrated) that includes instructions that, when executed by the processing system, cause the processing system to provide an augmented reality controller 304 that is configured to perform the functions of the augmented reality controller and/or server devices discussed below. In the specific example illustrated in FIG. 3, the augmented reality controller 304 is configured to computationally process an image and/or object feature points of an image against stored images and object feature points to determine whether there is substantial correspondence as well as the functionality discussed below.

The chassis 302 may further house a communication system 306 that is coupled to the augmented reality controller 304 (e.g., via a coupling between the communication system 306 and the processing system) and that is configured to provide for communication through the network as detailed below. The communication system 306 may allow the server device 300 to send and receive information over the network 104 of FIG. 1. The chassis 302 may also house a storage device (not illustrated) that provides a storage system 308 that is coupled to the augmented reality controller 304 through the processing system. The storage system 308 may be configured to store augmented reality profiles 310 in one or more augmented reality repositories. The augmented reality profiles 310 may include object identifiers 312 and annotation content 314. For example, the object identifiers 312 may include a set of feature points of the object, a QR code, an image frame, and/or any compact representation of an object. The annotation content 314 may include a two-dimensional image, a three-dimensional images, text, an audio file, a video file, a link to a website, an interactive annotation, and/or any other visual and/or auditory annotations that may be superimposed on and/or near an object in the physical environment being reproduced on a display screen of a user device. The annotation content 314 may also include instructions (e.g., a pose of the annotation) on how a user device is to display the annotation content in relation to the object that the annotation content is associated with.

Figure 4:
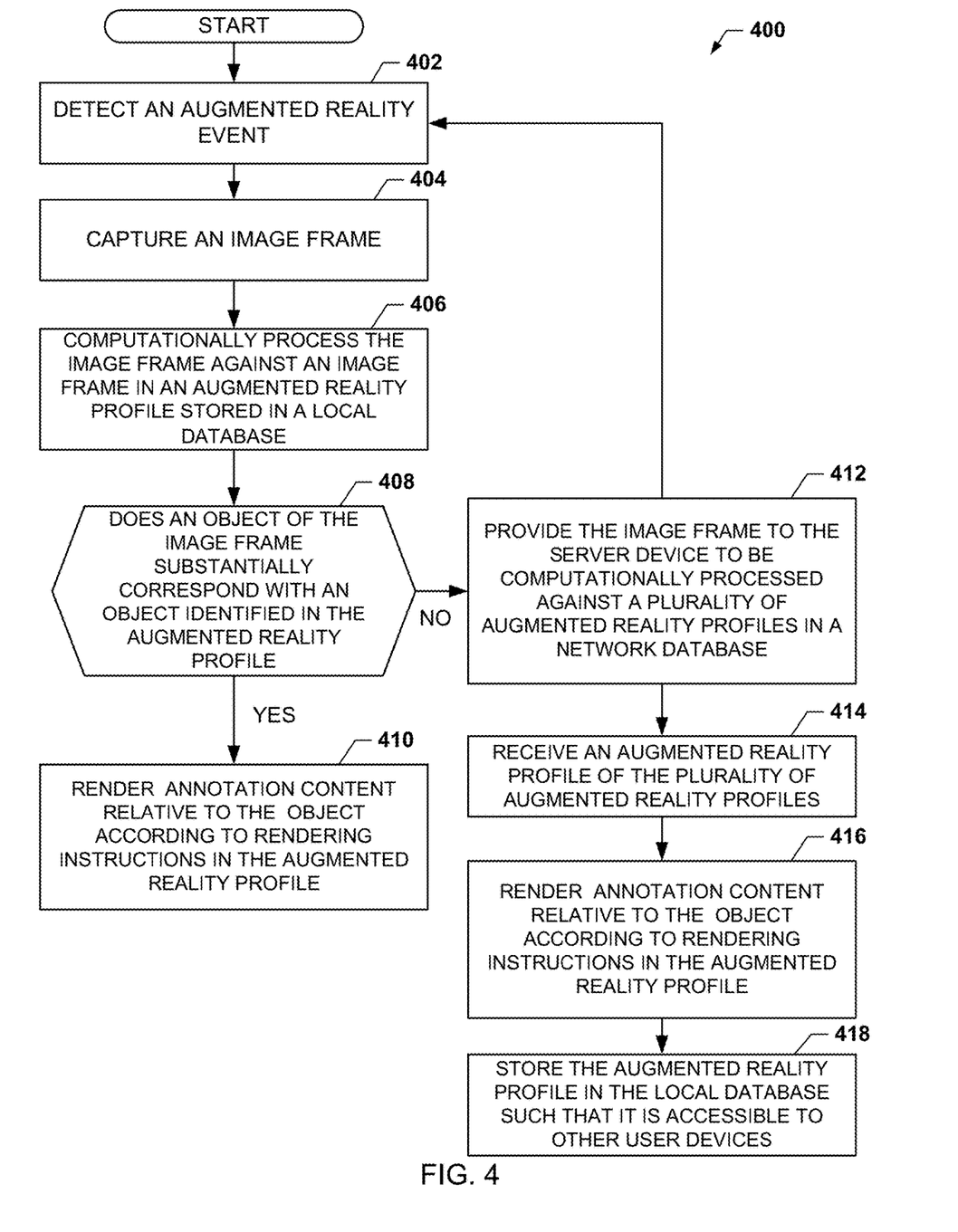
FIG. 4 is a flow chart illustrating an embodiment of a method of collaborative augmented reality.

Referring now to FIG. 4, an embodiment of a method 400 of collaborative augmented reality for socialization is illustrated. The method 400 will be discussed in reference to the Figs. above and FIG. 5 that illustrates modules and processes of the collaborative augmented reality controller 204 of FIG. 2. The method 400 begins at block 402 where an augmented reality event is detected. In an embodiment at block 402, the collaborative augmented reality controller 204 may be running an augmented reality application. For example, the augmented reality controller 204 may be running the augmented reality application on the application layer 206. The collaborative augmented reality controller 204 may be monitoring for an input that indicates that an augmented reality event has occurred, which initiates object recognition. For example, the base layer 208 may include an augmented reality event monitor 502 that monitors motion detector inputs 504 provided by the motion detector 230. The augmented reality event monitor 502 may be monitoring the physical environment 103 and/or the motion of the user device 200 within a user's hand to determine whether the user intends to recognize an object inside a current image frame of an imaging sensor. By basing the augmented reality event on motion, the augmented reality event monitor 502 can trigger object recognition by avoiding specific user commands such as screen touch or voice input, which provides a seamless user experience. For example, the augmented reality event monitor 502 may be monitoring for predetermined thresholds of steadiness of the user device 200 and/or a vertical orientation of the user device. Steady status of the user device may solve issues of motion blur when an image frame is captured for object recognition (i.e., objects in blurry image frames will not be recognized). Vertical status may filter out image frames that are irrelevant of the target. For example, when the imaging sensor is facing a ceiling or the sky at a horizontal orientation, object recognition is not likely going to be performed unless the augmented reality application is configured specific to such orientations. Thus, it is contemplated that other orientations and movements of the user device 200 are contemplated to fall under the scope of this disclosure.

Figure 5:
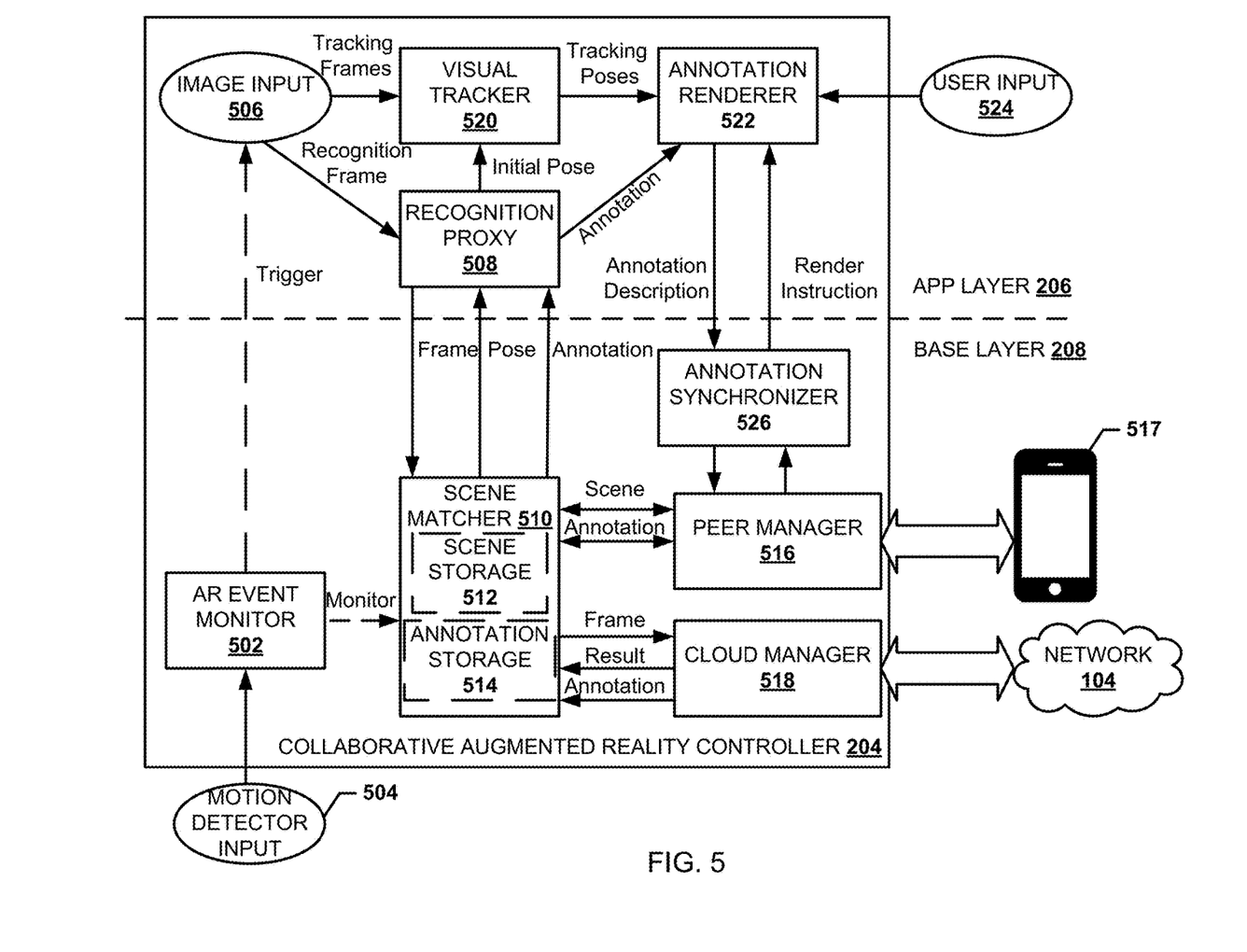
FIG. 5 is a schematic view illustrating an embodiment of a collaborative augmented reality controller provided by the user device of FIG. 2 during the method of FIG. 4.

Furthermore, the augmented reality event monitor 502 using the motion detector input 504 from the motion detector 230 to determine an augmented reality event can continue to monitor the movement of the user device 200 during the recognition procedure and causes the collaborative augmented reality controller 204 to ignore object recognition results if a predetermined threshold of movement of the user device 200 occurs during the object recognition procedure. Significant movement of the user device 200 may cause a mismatch between the object recognition results and an image frame captured as discussed below. While the specific example of the augmented reality event monitor 502 describes monitoring for motion detector inputs 504, one of skill in the art in possession of the present disclosure will recognize that the augmented reality event monitor 502 may be monitoring for other inputs such as a user voice command, a touch input, an image input to trigger object recognition, and/or any other user input or input from the physical environment.

The method 400 then proceeds to block 404 in response to the user device detecting an augmented reality event in block 402. In block 404 an image frame is captured. In an embodiment at block 404, the imaging sensor 224 may capture an image frame of the physical environment 103 and provide the image frame as an image input 506 to the collaborative augmented reality controller 204 as an image input 506. The image frame may include one or more objects (e.g., objects 108a and/or 108b) from the physical environment 103. For example, a camera may capture an image frame as the image input 506 and provide that image frame to the recognition proxy 508 included in the collaborative augmented reality controller 204 as the image frame. The recognition proxy 508 is the bridge between the application layer 206 and the base layer 208. As discussed above, the collaborative augmented reality controller 204 may be separated into the application layer 206 and the base layer 208. One of the benefits of separating the application layer 206 and the base layer 208 is that the separation makes the integration of conventional augmented reality applications simpler. For example, an augmented reality application that includes object recognition modules may be modified with the recognition proxy 508 and can send object recognition requests that include the image frame to the recognition proxy 508 without knowledge of the operations happening in the base layer 208. While the present disclosure separates collaborative augmented reality functions between the application layer 206 and the base layer 208, it is contemplated that the methods and functions for collaborative discussed herein may be included in a single application or any number of layers.

The method 400 then proceeds to block 406 where the image frame is computationally processed against an augmented reality profile stored in a local augmented reality database. In an embodiment at block 406, the collaborative augmented reality controller 204 may computationally process the image frame against one or more of the augmented reality profiles in the local augmented reality database, which may include the augmented reality profiles stored in the storage system 216 of the user device 200. In the embodiment illustrated in FIG. 5, the recognition proxy 508 may provide the image frame along with an object recognition request to a scene matcher 510 that is included in the base layer 208 of the collaborative augmented reality controller 204. The scene matcher 510 may have access to scene storage 512, which may include the object identifiers 220 of the augmented reality profiles 218. The scene matcher 510 may have access to annotation content storage 514, which may include the annotation content 222 of the augmented reality profiles 218. For example, each object identifier 220 may be associated with respective annotation content 222 such that when an image frame is computationally processed against the object identifiers 220 and there is substantial correspondence between an object in the image frame and an object identifier stored in the local augmented reality database, then the annotation content 222 that is associated with the object identifier is retrieved for rendering as discussed in further detail below.

In an embodiment, the scene matcher 510 includes an object recognition algorithm to identify objects in the image frame. For example, the object recognition algorithm may include the scale-invariant feature transform (SIFT) algorithm, the speeded up robust features (SURF) algorithm, the oriented FAST (Features from Accelerated Segment Test) and rotated BRIEF (Bianary Robust Independent Elementary Features) (ORB) algorithm, the FAST+Fast Retina Key Point (FREAK) algorithm, the Binary Robust Invariant Scalable Keypoints (BRISK), and/or any other object recognition algorithm. In an embodiment, the scene matcher 510 may include a probabilistic model to speed up object recognition on a mobile device such as the user device 200. For example, the probabilistic model may include the Gaussian Mixture Model (GMM) and the Bernoulli Mixture Model (BMM). The probabilistic model may be selected based on the object recognition algorithm. For example, the object recognition algorithm may include BMM built upon ORB functions as GMM does not integrate with binary descriptors as found in ORB.

Using the object recognition algorithm, the scene matcher 510 may detect features (i.e. interest points) in the image frame that was provided by the recognition proxy 508 in the object recognition request. For example, the scene matcher 510 may include a feature detector such as FAST, Harris and Stephens/Plessey/Shi-Tomasi, level curve curvature, Laplacian of the Gaussian (LoG), Difference of Gaussians, smallest univalue segment assimilating nucleus (SUSAN), and/or other feature detectors. Once the features detectors are detected, the scene matcher 510 may extract the features from the image frame to provide the feature descriptors. The scene matcher 510 may encode the feature descriptors into a compact feature representation, (e.g., a Fisher Vector (FV)). The scene matcher 510, then performs feature matching by calculating the distance between the compact feature representation and those (e.g., the object identifiers 220) in scene storage 512 one by one, as the local augmented reality database on user device 200 has fewer augmented reality profiles than that of the augmented reality database 110 in the network 104.

In an embodiment at block 406, the scene storage 512 and the annotation content storage 514 may include augmented reality profiles 218 that were obtained by the user device 200 from the server device 106 in a previous object recognition request that was computationally processed by the server device 106, obtained from the augmented reality profiles 110a/310 that are provided in the augmented reality database 110, and provided by the server device 106 over the network 104 to the user device 200. The augmented reality profiles 110a/310 may have been generated and stored in the augmented reality database 110 prior to the method 400. For example, images of the physical environment were taken and objects identified. A offline probabilistic model (e.g., Gaussian Mixture Model) may be built based on the feature points of all images in the network augmented reality database. Using this model, the feature descriptors of an image are encoded into a compact representation (e.g., a Fisher Vector). The compact feature representations of the images are stored using a hash function (e.g., Locality Sensitive Hashing, LSH) for faster retrieval. However, in other embodiments, one or more machine learning algorithms to perform supervised machine learning, unsupervised machine learning (e.g., deep belief networks, neural networks, statistical pattern recognition, rule-based artificial intelligence, etc.) semi-supervised learning, reinforcement learning, deep learning, and other machine learning algorithms when updating, creating, and/or reinforcing an augmented reality profile 110a/310 and/or any other profile stored in the network augmented reality database 110 discussed herein that is updatable over time based on received image frames.

In other embodiments, the augmented reality profiles 218 may have been received from the server device 106 by a second user device and provided to the local augmented reality database by the second user device. For example, the user device 102a may be performing the object recognition request on object 108a and the user device 102b may have performed an object recognition request on object 108b and received object recognition results that included annotation content from the server device 106 or from another user device. If the user device 102a and the user device 102b are in proximity to each other such that they can communicate device-to-device through a Wi-Fi Direct, BLE, and/or any other direct communication protocol used by the second communication interface 214 described above, then the user device 102a may share the augmented reality profile that the user device 102a received in response to the object recognition request for object 108a with the user device 102b such that the augmented reality profile for the object 108a is added to the local augmented reality database. Similarly, the user device 102b may share the augmented reality profile that the user device 102b received in response to the object recognition request for object 108b with the user device 102a such that the augmented reality profile for the object 108b is added to the local augmented reality database.

The augmented reality profiles 218 may be provided to the local augmented reality database such that the augmented reality profiles 218 are provided to other user devices within the physical environment 103 according to several examples. In various examples, the collaborative augmented reality controller 204 may include a peer manager 516 that is coupled to the scene matcher 510. The peer manager 516 may utilize the second communication interface 214, (e.g., WiFi Direct or Bluetooth Low Energy), as described above, for peer discovery and device-to-device communications. The peer manager 516 may periodically scan for nearby user devices running the same augmented reality application. The peer manager 516 may maintain a list of peer devices. Peer devices 517 may be user devices that the peer manager 516 can collaborate with such that the list of peer devices is dynamically changing as user devices come in and out of range of the second communication interface 214. In various examples, the peer manager 516 may receive augmented reality profiles 218 from peer devices 517 that are on the list of peer devices that receive augmented reality profiles from the server device 106. In other examples, the peer manager 516 may provide a request to the peer devices 417 included in the list of peer devices for augmented reality profiles after determining that the augmented reality profiles 218 stored on its storage system 216 do not share a substantial correspondence with the image frame of the object recognition request, as discussed below. In other examples, after determining that the augmented reality profiles 218 stored on its storage system 216 do not share a substantial correspondence with the image frame of the object recognition request, the peer manager 516 may provide the compact feature representation of the image frame to the peer devices on the list of peer devices such that the peer devices 517 can computationally process the compact feature representation against the object identifiers 220 included in the augmented reality profiles 218 stored in their storage systems 216.

The peer manager 516 can also optimize sharing and fetching of augmented reality profiles from peer user device via preference aware sharing policies. For example, a user of the user device 200 may select or otherwise declare preferences as to what objects within the physical environment 103 that the user is interested in. Thus, the user device 200 will not receive augmented reality profiles from peer device 517 on the list of peer devices of objects that the user is not interested in or receive augmented reality profiles associated with objects that the user is only interested in. In various examples to minimize the communication overhead on the second communication interface 214, the user device 200 may not forward augmented reality profiles that it received from peer devices 517 on the list of peer to other peer devices 517. However, it is contemplated that the user device 200 may forward augmented reality profiles it received from peer devices 517 on the list of peer devices to other peer devices 517. In various examples, the augmented reality profiles may be assigned a time-to-live policy such that the augmented reality profiles 218 are shared based on when the augmented reality profiles 218 were retrieved from the server device 106 and/or based on a geofence such that the augmented reality profiles 218 is shared while the user device 200 is within a geographical bound and/or not shared when the user device 200 is outside of that geographical bound. The peer manager 516 may use data collected from the positioning system 226 to determine whether the user device 200 satisfies a time-to-live policy.

The method 400 may then proceed to block 408 where it is determined whether an object of the image frame substantially corresponds with an object identified in the augmented reality profile stored in the local augmented reality database. In an embodiment, at block 408 the scene matcher 510 may determine whether there is substantial correspondence between an object in the image frame and the object identifiers 220 in one or more augmented reality profiles 218. For example, the scene matcher 510, may perform feature matching, as described in block 406, by calculating the distance between the compact feature representation and those (e.g., the object identifiers 220) in scene storage 512. The objects of the image frame may have substantial correspondence with object identifiers 220 in the augmented reality profiles 118 when a predefined condition is satisfied. For example, the predefined condition may be that one or more compact feature representations of the object match the object identifiers 220 or satisfy a predetermined threshold of similarity (e.g., 50% similar, 60% similar, 70% similar, 80% similar, 85% similar, 90% similar, 95% similar, 99% similar, 100% similar and other thresholds of similarity) with the object identifiers 220 in the augmented reality profile 218. Substantial correspondence may also include situations where unsupervised machined learning techniques (e.g., using cluster analysis), and/or supervised machine learning techniques (e.g., using statistical classification) determines that compact feature representations of the object in one group are more similar to each other than those in other groups.

If it is determined that the object of the image frame substantially corresponds with an object identified in the augmented reality profile stored in the local augmented reality database in block 408 of method 400, then method 400 proceeds to block 410, where the annotation content of the augmented reality profile is rendered relative to the object according to rendering instructions provided with the annotation content. In an embodiment at block 410, the scene matcher 510 may, using the compact feature representation and the object identifiers 220 of the matching augmented reality profile in the local augmented reality database, determine the homography between the compact feature representation and the object identifier to find their geometric transformation. The scene matcher 510 then adjusts the corresponding object recognition result of the object identifiers according to the homography, to determine an initial pose (i.e., position and orientation) of the object, which becomes the result for the image frame that was provided in the object recognition request. The scene matcher 510 may provide the initial pose of the object as well as the associated annotation content 222 for that object to the recognition proxy 508. The annotation content 222 may include rendering instructions that define how the annotation content is to be rendered in relation to the object recognized. The recognition proxy 508 may provide the initial pose to a visual tracker 520 and the annotation content to the annotation renderer 522 both of which are included in the application layer 206 of the collaborative augmented reality controller 204.

The visual tracker 520 may track the pose of an object as the user device 200 and/or the imaging sensor 224 changes its view of the object. The visual tracker 520 may be initialized by the recognition proxy 508 such that the visual tracker 520 uses the initial pose of the object as its starting point and uses continuous image frames being received from the imaging sensor 224 as the image inputs 506 and calculates a tracked pose of the object for each frame. The tracked pose of the object may include three dimensions of translation and three dimensions of rotation (i.e., six degrees of freedom (6 DoF)). The feature points of the object may be used by the visual tracker 520 to calculate the tracked pose of the object in each frame, and the visual tracker 520 may include optical flow tracking to track these feature points in the image frame sequence. The visual tracker 520 may provide the tracked pose of the object for each frame to the annotation renderer 522.

The annotation renderer 522 may augment the recognized object in the image frame and subsequent image frames with the annotation content received from the recognition proxy 508 and provide the augmented image frame with the annotation to the display system 223 of the user device 200 for display on a display screen of the display system 223. The annotation renderer 522 may calculate a pose of the annotation for rendering and may include a three-dimensional graphics engine to render the annotation in a three-dimensional space to align the annotation content to the object in each frame according to the rendering instructions provided with the annotation content and/or rendering instructions included on the annotation renderer 522. The annotation renderer 522 may also render the annotation content according to user inputs 524 provided by the user of the user device 200. For example, the user may provide touch inputs to a touchscreen display system and the annotation renderer 522 may modify the annotation content according to those rendering instruction provided by the touch inputs.

The user inputs 524 may also be provided from the annotation renderer 522 to an annotation synchronizer 526 that is in the base layer 208 and that is in communication with the peer manager 516 such that any changes to the annotation content associated with an augmented reality profile 218 may update the annotation content 222 stored in that augmented reality profile 218. Thus, peer device 517 that are accessing the augmented reality profile 218 from the local augmented reality database may receive the updated annotation content 222 from the user device 200 that is updating the annotation content 222 based on the user input 524. Similarly, the annotation renderer 522 may receive rendering instructions from the annotation synchronizer 526, which may be monitoring for changes made to the augmented reality profiles 218 associated with the annotation content and the object being rendered by the annotation renderer 522. The annotation content being rendered may be experiencing changes due to user inputs provided on a peer device 517 that is providing the augmented reality profile to the user device 200.

In an embodiment, the annotation synchronizer 526 may enable instantaneous interactions among users via synchronizing the annotation status so that one can see in real-time the modifications made by other users. Since the objects within a user's current imaging sensor view are recognized by the scene matcher 510, the peer manager 516 may determine from the object identities other peer devices 517 on list of peer devices that are viewing the object as well. The annotation synchronizer 526 of the user device 200 may share with other annotation synchronizers of peer devices 517 the description of annotations (e.g., a pose of the annotation content, texture, lightness and other changes caused by user manipulations such as moving, scaling, and/or rotating the annotation content). The user of the user device 200 may selectively choose to implement annotation content changes by others. For example, the user may choose an option in the application to render all changes to annotation content provided by others, choose an option not to allow annotation content changes, or choose an option to receive a notification and description of the annotation content changes such that the user may accept those changes or not. In other embodiments, the annotation content changes made by other users can be implemented by the annotation synchronizer 526 based on user preferences policies as described above.

Returning to block 408 of method 400, if it is determined that the object of the image frame does not substantially corresponds with an object identified in the augmented reality profile stored in the local augmented reality database in block 408 of method 400, then method 400 proceeds to block 412, where the image frame is provided to a server device to be computationally processed against a plurality of augmented reality profiles in a network database. In an embodiment at block 412, the scene matcher 510 may provide the image frame and the object recognition request from the recognition proxy 508 to the network 104 via a cloud manager 518, when the object of the image frame does not substantially correspond with the object identified in the augmented reality profile 218 stored in the local augmented reality database. The cloud manager 518 may communicate with the network 104 via the first communication interface 212 (e.g., a WiFi and/or LTE communication interface), as discussed above. The server device 106/300 may receive the image frame and the object recognition request from the network 104 and the augmented reality controller 304 may computationally process the image frame against the object identifiers 312 of the augmented reality profile 310 stored in the network augmented reality database 110, which includes the storage system 308. The augmented reality controller 304 may perform the feature detection and extraction to determine feature descriptors, perform feature encoding to generate a compact feature representation of the object, perform object recognition by feature matching the features of the compact feature representation of the object to the object identifiers 312 in the augmented reality profiles 310, and calculating the initial pose of the object after determining an augmented reality profile substantially corresponds with the object in the image frame according to the examples discussed above when the scene matcher 510 is performing the image processing described above in block 406. While in various embodiments, the server device 300 may receive the image frame associated with the object recognition request, it is contemplated that because the scene matcher 510 has already computationally processed the image frame against the augmented reality profiles stored in the local augmented reality database, the scene matcher 510 may provide to the server device 300 the compact feature representation of the image frame that the scene matcher 510 determined when computationally processing the image frame against the image frame or other object identifier 220 in the augmented reality profiles 218 stored in the local augmented reality database. However, in other examples, the scene matcher 510 may provide to the server device 300 a processed image frame according to any of the image processing techniques performed by the scene matcher 510 after receiving the image frame in the object recognition request, while not departing from the scope of the present disclosure.

The method 400 then proceeds to block 414, where the user device receives at least a portion of the augmented reality profile of the plurality of augmented reality profiles stored in the network augmented reality database. In an embodiment at block 414, the server device 300 may provide through the network 104 to the user device 200, at least the annotation content and the results of the pose estimation of the object, when the object of the image frame of the object recognition request has substantial correspondence with an object identifier 312 of that augmented reality profile 310. However, it is contemplated that the server device 300 may provide to the user device 200 the entire augmented reality profile 310 that includes the object identifier 312 and the annotation content 322, such that the pose of the object can be determined by the scene matcher 510. In other examples, the server device 300 may provide to the user device 200, the augmented reality profile 310 and object recognition result (e.g., the initial pose of the object and the identity of the object).

The method 400 then proceeds block 416 where the annotation content is rendered relative to the object according to rendering instruction received in the object recognition results provided by the server device. In an embodiment at block 416, the scene matcher 510 may provide the object recognition results from the server device 300 to the recognition proxy 508. The object recognition results may include the initial pose of the object, the annotation content 314, and any rendering instructions associated with the annotation content 314. The recognition proxy 508 may provide the annotation content 322 to the annotation renderer 522 and the initial pose to the visual tracker for rendering the annotation content 322 in relation to the object on a display screen of the display system 223 of the user device 200, as described above in block 410.

The method 400 may proceed to block 418 where the augmented reality profile received from the server device is stored in the local augmented reality database such that it is accessible to the user device and other peer devices. In an embodiment at block 418, the scene matcher may store the augmented reality profile 310 received from the server device 300 as an augmented reality profile 218 in the local augmented reality database that includes the storage system 216. In various examples where the annotation content 314 and the recognition result (e.g., the initial pose of the object and identity of the object) are provided from the server device 300 to the user device 200 via the cloud manager 518, the scene matcher 510 may generate an augmented reality profile 218 for that object. The scene matcher 510 may insert the object recognition result from the server device 300 with the image frame provided with the object recognition request, the features points of an object in the image frame, and the compact feature representation of the object to generate an object identifier 220, which may include a tuple of {the initial image frame, the object recognition result, the feature points, and the compact feature representation of the object}. The scene matcher 510 may store the object identifier 220 with the annotation content 314 which becomes annotation content 222 of an augmented reality profile 218. The scene matcher 510, via the peer manager 516, may share the generated augmented reality profile 218 with the peer devices 517 included on the list of peer device that is maintained by the peer manager 516.

In various embodiments, other than receiving augmented reality profiles from peer devices 517 that are on the list of peer devices to populate the local augment reality database with augmented reality profiles 218, the collaborative augmented reality controller 204 may request the server device 300 to provide object recognition results that include the augmented reality profiles 10 in advance. For example, if the scene matcher 510 knows that user device 102*a* is viewing the object 108*a* and the scene matcher 510 and/or the augmented reality controller 304 knows there is the object 108*b* near the object 108*a* and the user device 102*a* is moving toward that object 108*b*, the scene matcher 510 may request that the server device 106 provide or the server device 106 may provide the object recognition result for the object 108*b* that were generated for the user device 102*b*. In this example, the collaboration does not happen directly over device-to-device communication, but utilizes the server device 300 as a remote cache for sharing. However, this approach requires localization/mobility prediction based on inputs from the positioning system 226, which may require extra mobile data, especially for outdoor physical environments.

Thus, systems and methods have been provided for collaborative augmented reality. A user device may collaborate with other user devices within a physical environment that are using the same augmented reality application to receive and/or provide information between each other such that computationally expensive augmented reality results are can be shared between user devices rather than requested from a cloud-based application repetitively by each user device when that user device performs object recognition on the same object. This improves efficiency by reusing computation resources in the cloud, reduces end-to-end latency, and saves mobile data usage.

Figure 6:
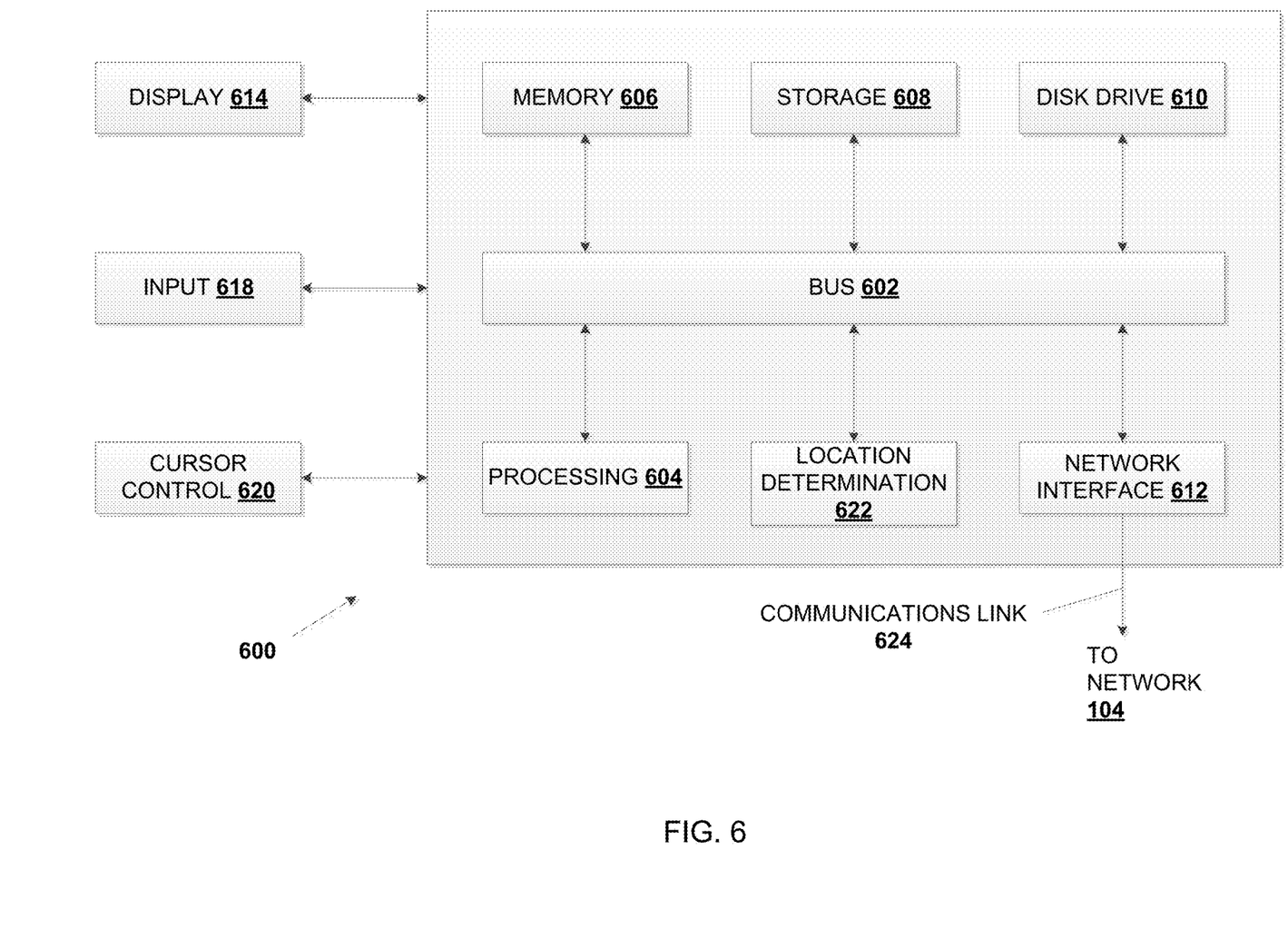
FIG. 6 is a schematic view illustrating an embodiment of a computer system.

Referring now to FIG. 6, an embodiment of a computer system 600 suitable for implementing, for example, the user devices 102*a*, 102*b*, and 200, and the server devices 106 and 300 is illustrated. It should be appreciated that other devices utilized in the collaborative augmented reality system 100 discussed above may be implemented as the computer system 600 in a manner as follows.

In accordance with various embodiments of the present disclosure, computer system 600, such as a computer and/or a network server, includes a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 618 (e.g., keyboard, keypad, or virtual keyboard), a cursor control component 620 (e.g., mouse, pointer, or trackball), and/or a location determination component 622 (e.g., a Global Positioning System (GPS) device as illustrated, a cell tower triangulation device, and/or a variety of other location determination devices.) In one implementation, the disk drive component 610 may comprise a database having one or more disk drive components.

In accordance with embodiments of the present disclosure, the computer system 600 performs specific operations by the processing component 604 executing one or more sequences of instructions contained in the system memory component 606, such as described herein with respect to the drone(s), the drone docking station(s), the service platform, and/or the remote monitor(s). Such instructions may be read into the system memory component 606 from another computer-readable medium, such as the static storage component 608 or the disk drive component 610. In other embodiments, hardwired circuitry may be used in place of or in combination with software instructions to implement the present disclosure.

Logic may be encoded in a computer-readable medium, which may refer to any medium that participates in providing instructions to the processing component 604 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 610, volatile media includes dynamic memory, such as the system memory component 606, and tangible media employed incident to a transmission includes coaxial cables, copper wire, and fiber optics, including wires that comprise the bus 602 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 600. In various other embodiments of the present disclosure, a plurality of the computer systems 600 coupled by a communication link 624 to a communication network 65 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (e.g., application code) through the communication link 624 and the network interface component 612. The network interface component 612 may include an antenna, either separate or integrated, to enable transmission and reception via the communication link 624. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A collaborative, multi-device augmented reality (AR) method comprising:
   at a first AR device, presenting to a user thereof first information that visually augments at least one object computationally recognized in a segmented visual field thereof, the first information retrieved over a wide-area network from a network service platform based on correspondence of the computationally recognized object with an object descriptor maintained within the network service platform; and
   at the first AR device, presenting to the user thereof second information that visually augments at least one other object computationally recognized in the segmented visual field, wherein the second information is not directly retrieved from the network service platform, but rather is received from a second AR device locationally proximate to the first AR device based on prior computational recognition at the second AR device of a corresponding object within a visual field of the second AR device.

2. The method of claim 1, wherein the prior computational recognition at the second AR device of the at least one other object was performed by the network service platform and provided to the second AR device by the network service platform.

3. The method of claim 1, further comprising:
   providing the object descriptor of the at least one object computationally recognized and the first information to the second AR device.

4. The method of claim 3, further comprising:
providing third information that the first AR device associated with the object computationally recognized in the segmented visual field to the second AR device with the object descriptor.

5. The method of claim 1, wherein the first information retrieved over a wide-area network from the network service platform based on correspondence of the computationally recognized object with an object descriptor maintained within the network service platform is performed subsequently to determining that the second AR device locationally proximate to the first AR device does not include prior computational recognition at the second AR device of the corresponding object within the visual field of the second AR device.

6. The method of claim 1, further comprising:
modifying, at the first AR device, the second information to third information based on received user input instruction; and
providing, by the first AR device, the third information to any AR device consuming the second information.

7. The method of claim 1, further comprising:
providing, by the first AR device, location data of the first AR device to the network service platform over time, wherein the first information is retrieved over the wide-area network from the network service platform based on a known location of the at least one object, a current location of the first AR device, and a direction that the first AR device is travelling within a physical environment.

8. A collaborative augmented reality system, comprising:
a communication system;
a processor coupled to the communication system; and
a memory system coupled to the processor and storing instructions which, when executed by the processor, cause the processor to perform operations comprising:
presenting to a user thereof first information that visually augments at least one object computationally recognized in a segmented visual field thereof, the first information retrieved over a wide-area network from a network service platform based on correspondence of the computationally recognized object with an object descriptor maintained within the network service platform; and
presenting to the user thereof second information that visually augments at least one other object computationally recognized in the segmented visual field, wherein the second information is not directly retrieved from the network service platform, but rather is received from an augmented reality (AR) device locationally proximate to the communication system based on prior computational recognition at the AR device of a corresponding object within a visual field of the AR device.

9. The system of claim 8, wherein the prior computational recognition at the AR device of the at least one other object was performed by the network service platform and provided to the AR device by the network service platform.

10. The system of claim 8, wherein the operations further comprise:
providing the object descriptor of the at least one object computationally recognized and the first information to the AR device.

11. The system of claim 10, wherein the operations further comprise:
providing, via the communication system, third information that the processor associated with the object computationally recognized in the segmented visual field to the AR device with the object descriptor.

12. The system of claim 8, wherein the first information retrieved over the wide-area network from the network service platform based on correspondence of the computationally recognized object with the object descriptor maintained within the network service platform is performed subsequently to determining that the AR device locationally proximate to the communication system does not include prior computational recognition at the AR device of the corresponding object within the visual field of the AR device.

13. The system of claim 8, wherein the operations further comprise:
modifying the second information to third information based on received user input instruction; and
providing the third information to any AR device consuming the second information.

14. A non-transitory machine-readable medium having stored thereon machine-readable instructions executable to cause a machine to perform operations comprising:
at a first Augmented Reality (AR) device, presenting to a user thereof first information that visually augments at least one object computationally recognized in a segmented visual field thereof, the first information retrieved over a wide-area network from a network service platform based on correspondence of the computationally recognized object with an object descriptor maintained within the network service platform; and
at the first AR device, presenting to the user thereof second information that visually augments at least one other object computationally recognized in the segmented visual field, wherein the second information is not directly retrieved from the network service platform, but rather is received from a second AR device locationally proximate to the first AR device based on prior computational recognition at the second AR device of a corresponding object within a visual field of the second AR device.

15. The non-transitory machine-readable medium of claim 14, wherein the prior computational recognition at the second AR device of the at least one other object was performed by the network service platform and provided to the second AR device by the network service platform.

16. The non-transitory machine-readable medium of claim 14, wherein the operations further comprise:
providing the object descriptor of the at least one object computationally recognized and the first information to the second AR device.

17. The non-transitory machine-readable medium of claim 16, wherein the operations further comprise:
providing third information that the first AR device associated with the object computationally recognized in the segmented visual field to the second AR device with the object descriptor.

18. The non-transitory machine-readable medium of claim 14, wherein the first information retrieved over the wide-area network from the network service platform based on correspondence of the computationally recognized object with the object descriptor maintained within the network service platform is performed subsequently to determining that the second AR device locationally proximate to the first AR device does not include prior computational recognition at the second AR device of the corresponding object within the visual field of the second AR device.

19. The non-transitory machine-readable medium of claim 14, wherein the operations further comprise:
   modifying the second information to third information based on received user input instruction; and
   providing the third information to any AR device consuming the second information.

20. The non-transitory machine-readable medium of claim 14, wherein the operations further comprise:
   providing location data of the first AR device to the network service platform over time, wherein the first information is retrieved over the wide-area network from the network service platform based on a known location of the at least one object, a current location of the first AR device, and a direction that the first AR device is travelling within a physical environment.

* * * * *